United States Patent [19]

Koiwai et al.

[11] Patent Number: 5,452,141
[45] Date of Patent: Sep. 19, 1995

[54] AUTOMOBILE REARVIEW MIRROR ASSEMBLY WITH MIRROR HOLDER SUPPORT STRUCTURE

[75] Inventors: Hideo Koiwai, Sakado; Manabu Tamiya, Kawagoe, both of Japan

[73] Assignee: Kabushiki Kaisha Matsuyama Seisakusho, Tokyo, Japan

[21] Appl. No.: 85,046

[22] Filed: Jul. 2, 1993

[30] Foreign Application Priority Data

Jul. 2, 1992 [JP] Japan .............................. 4-052760 U

[51] Int. Cl.⁶ .............................................. G02B 7/182
[52] U.S. Cl. ...................................... 359/874; 359/872
[58] Field of Search ............... 359/871, 872, 873, 874, 359/876, 881; 74/502.1

[56] References Cited

U.S. PATENT DOCUMENTS

| | | | |
|---|---|---|---|
| 4,324,454 | 4/1982 | Kumai | 359/873 |
| 4,598,605 | 7/1986 | Manzoni | 74/502.1 |
| 4,930,370 | 6/1990 | Yoshida | 359/873 |
| 5,343,333 | 8/1994 | Nagayama et al. | 359/874 |

Primary Examiner—Scott J. Sugarman
Assistant Examiner—Thomas Robbins
Attorney, Agent, or Firm—Howard L. Rose

[57] ABSTRACT

An automobile rearview mirror has a mirror housing having a spherical pivot and a mirror holder having a spherical cavity in which the spherical pivot is rotatably received. The mirror holder comprises a substantially flat panel and an attachment disposed on one side of the panel and defining the spherical cavity therein. The attachment has a gap defined therein radially outwardly of the spherical cavity. A mirror is supported on an opposite side of the panel. The attachment comprises a pair of semicylindrical socket members projecting from the one side of the panel. The semicylindrical socket members have respective inner arcuate walls and respective outer arcuate walls spaced radially outwardly from the inner arcuate walls, respectively. The inner arcuate walls define the spherical cavity therebetween, and the gap is defined between the inner arcuate walls and the outer arcuate walls. The inner arcuate walls are rendered resilient by the gap to allow the spherical pivot to be fitted easily into the spherical cavity. After the spherical pivot has been fitted easily in the spherical cavity, the spherical pivot is stably held therein by the resilient inner arcuate walls.

13 Claims, 4 Drawing Sheets

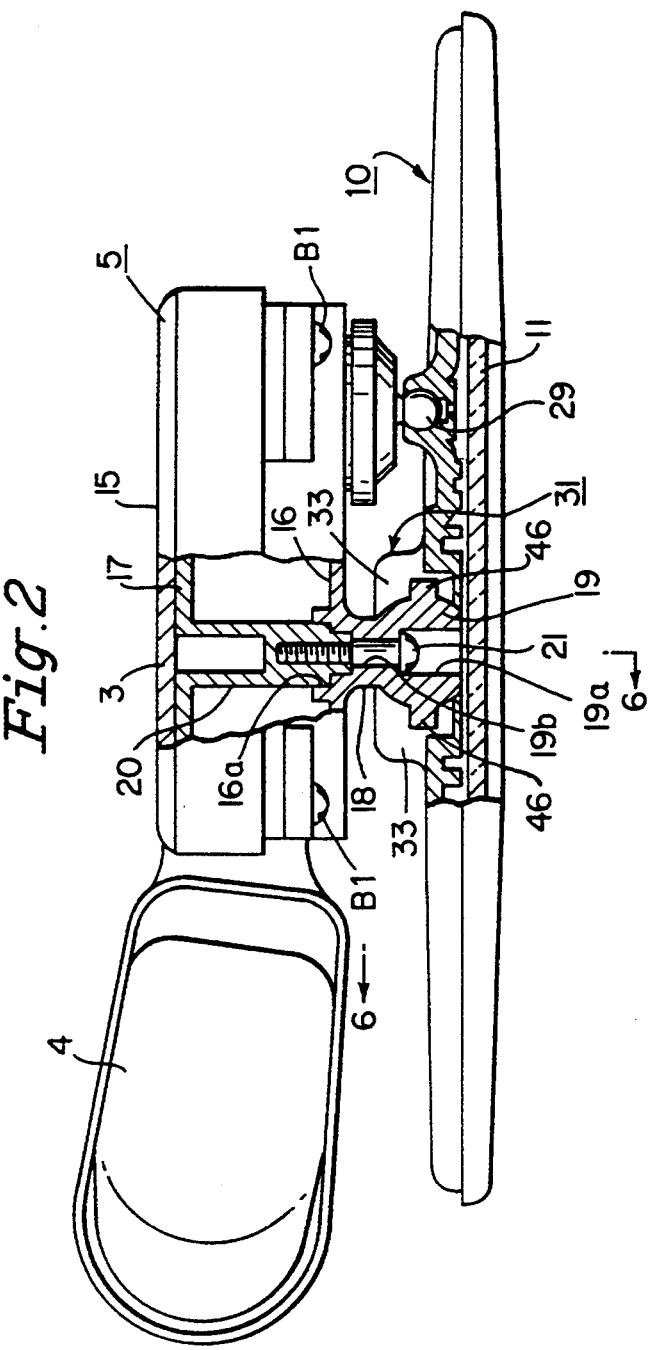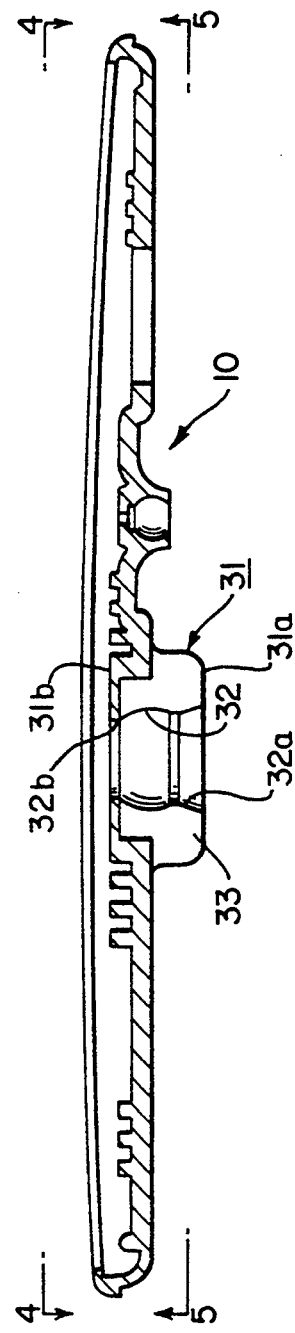

AUTOMOBILE REARVIEW MIRROR ASSEMBLY WITH MIRROR HOLDER SUPPORT STRUCTURE

BACKGROUND OF THE INVENTION

1. Field of the Invention

The present invention relates to a rearview mirror assembly for use on an automobile, and more particularly to a support structure for a mirror holder of an automobile rearview mirror assembly.

2. Description of the Prior Art

Rearview mirror assemblies such as those for use on automobiles or the like include remotely controlled motor-driven rearview mirror assemblies. The remotely controlled motor-driven rearview mirror assemblies have a mirror disposed in a mirror housing and horizontally tiltable to give the automobile driver a clear rearward view of following automobiles and other objects.

Usually, the mirror is supported on a face side of a mirror holder made of a resilient synthetic resin such as polypropylene, the mirror holder having a spherical pivot on its back side. The spherical pivot is fitted in a spherical cavity defined in the mirror housing so that the mirror holder is pivotally supported in the mirror housing.

One conventional mirror holder support structure is disclosed in Japanese utility model publication No. 62-25955 published Jul. 2, 1987.

The disclosed conventional mirror holder support structure is used to support the mirror holder of a remotely controlled motor-driven rearview mirror assembly. A mirror is supported on the face side of a mirror holder which has a spherical pivot. The spherical pivot is movably fitted in a spherical cavity defined in a mirror housing. Therefore, the mirror holder is tiltably supported in the mirror housing through the spherical pivot received in the spherical cavity.

The wall surrounding the spherical cavity has a plurality of spaced recesses defined therein, providing a plurality of resilient arms alternating with the recesses. When the mirror holder is assembled into the mirror housing, the spherical pivot can easily be fitted into the spherical cavity because the arms can resiliently be flexed radially outwardly by the spherical pivot as it is forced into the spherical cavity. However, after the spherical pivot has been fitted into the spherical cavity, the spherical pivot may not stably be held in position as the arms are resilient. To keep the spherical pivot stably in the spherical cavity, the conventional mirror holder support structure has a ring spring looped around the arms to tighten the arms on the spherical pivot, thus securely holding the spherical pivot in the spherical cavity.

The conventional mirror holder support structure is however relatively complex and made up of a relatively large number of parts because of the ring spring.

SUMMARY OF THE INVENTION

It is an object of the present invention to provide a mirror holder support structure for use in an automobile rearview mirror, the mirror holder support structure being capable of allowing a spherical pivot on a mirror housing to be easily fitted into a spherical cavity in a mirror holder and also of retaining the spherical pivot stably in the spherical cavity once the spherical pivot is fitted in the spherical cavity.

According to the present invention, there is provided a mirror holder support structure for use in an automobile rearview mirror, comprising a mirror housing having a spherical pivot, a mirror holder having a substantially flat panel and an attachment disposed on one side of the panel, the attachment having a spherical cavity defined therein, the spherical pivot being rotatably fitted in the spherical cavity, the attachment having a gap defined therein radially outwardly of the spherical cavity, and a mirror supported on an opposite side of the panel.

According to the present invention, there is also provided a mirror holder support structure for use in an automobile rearview mirror, comprising a mirror housing having a spherical pivot, a mirror holder having a spherical cavity, the spherical pivot being rotatably fitted in the spherical cavity, the mirror holder having a pair of diametrically opposite inner arcuate walls defining the spherical cavity therebetween and a pair of diametrically opposite outer arcuate walls spaced radially outwardly from the inner arcuate walls by a gap between the inner and outer arcuate walls, and a mirror supported on an opposite side of the panel.

The gap makes the inner arcuate wall resilient enough to allow the spherical pivot to be fitted easily into the spherical cavity. After the spherical pivot has been fitted easily in the spherical cavity, the spherical pivot is stably held therein by the resilient inner arcuate walls.

The above and further objects, details and advantages of the present invention will become apparent from the following detailed description of preferred embodiments thereof, when read in conjunction with the accompanying drawings.

BRIEF DESCRIPTION OF THE DRAWINGS

FIG. 2 is a plan view of the tiltable rearview mirror assembly which incorporates a mirror holder support structure according to a first embodiment of the present invention, with a mirror housing omitted from illustration;

FIG. 3 is a transverse cross-sectional view of a mirror holder of the tiltable rearview mirror assembly shown in FIG. 2;

DETAILED DESCRIPTION OF THE PREFERRED EMBODIMENTS

Figure 1:
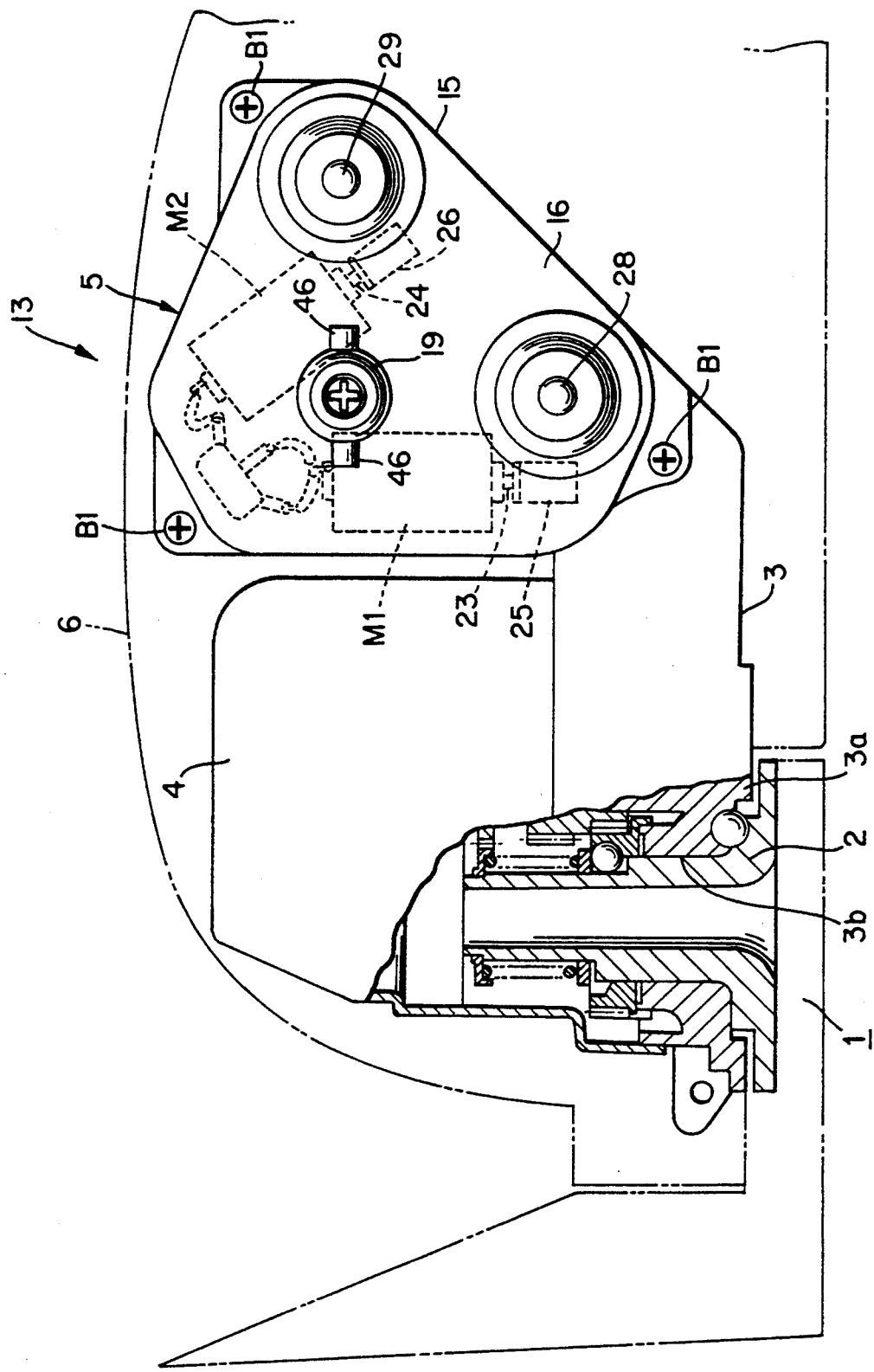
FIG. 1 is a fragmentary front elevational view, partly in cross section, of a tiltable rearview mirror assembly to be mounted on an automobile door, with a mirror holder omitted from illustration.

As shown in FIG. 1, a tiltable rearview mirror assembly for use on an automobile (not shown) is supported on a base 1 to be installed on an automobile door (not shown). The base 1 has a vertical cylindrical shaft 2 extending through a hole 3b that is vertically defined in an end 3a of a bracket 3. The bracket 3 is thus horizontally angularly movable about the vertical cylindrical shaft 2.

The bracket 3 supports a mirror housing actuator unit 4 for actuating a mirror housing of the rearview mirror assembly for horizontal tilting movement. The bracket 3 also supports a mirror actuator unit 5 positioned adjacent to the mirror housing actuator unit 4 for adjusting the angle of a mirror of the rearview mirror assembly. The bracket 3, the mirror housing actuator unit 4, and the mirror actuator unit 5 are accommodated in a mirror housing 6, which is fastened to the bracket 3 by screws or the like.

A mirror 11 (see FIG. 2) is supported on a face side of a mirror holder 10 that is angularly movably supported by the mirror actuator unit 5 by a mirror holder support structure according to a first embodiment of the present invention. The bracket 3, the mirror housing actuator unit 4, the mirror actuator unit 5, the mirror housing 6, the mirror holder 10, and the mirror 11 jointly make up a mirror assembly 13, which is horizontally angularly movable about the vertical cylindrical shaft 2.

The mirror housing actuator unit 4 has a motor (not shown) and gears (not shown) for transmitting rotative power from the motor. The motor is energized when a switch (not shown) in the passenger's compartment of the automobile is turned on. When the motor is energized, the mirror assembly 13 is angularly moved about the shaft 2 into an operative position in which the mirror assembly 13 projects laterally outwardly or a collapsed position in which the mirror assembly 13 lies substantially parallel to the automobile door.

As shown in FIG. 2, the mirror actuator unit 5 has a case 15 composed of a pair of case members 16, 17 each of synthetic resin which are fastened to the bracket 3 by screws B1. The case member 16 has a boss 18 projecting rearwardly from a rear surface thereof and having a spherical pivot 19 on its distal end. The spherical pivot 19 has a pair of diametrically opposite fingers 46 projecting radially outwardly therefrom and held in engagement with the mirror holder 10. The boss 18 also has a larger-diameter hole 19a and a smaller-diameter hole 19b which are defined along the axis of the boss 18 and aligned with each other. The case member 17 has a stiffener tube 20 projecting rearwardly from a rear surface thereof toward the case member 16 in alignment with the boss 18. The stiffener tube 20 has its distal end fitted in a recess 16a defined in a front surface of the case member 16. The boss 18 and the stiffener tube 20 are axially connected to each other by a screw 21 which extends axially through larger- and smaller-diameter holes 19a, 19b in the boss 18 and is threaded into the stiffener tube 20.

As shown in FIG. 1, the mirror actuator unit 5 has a pair of motors M1, M2 housed in the case 15. The motors M1, M2 have respective rotatable shafts 23, 24 supporting respective worms 25, 26 that are held in mesh with respective worm wheels (not shown) on actuating rods 28, 29, respectively. The actuating rods 28, 29 extend substantially perpendicularly to the mirror holder 10 and have respective spherical ends fitted in respective spherical cavities in the mirror holder 10. The actuating rods 28, 29 are positioned on respective imaginary straight lines that pass through the spherical pivot 19 and are angularly spaced from each other by about 90°.

When the motor M1 is energized, the actuating rod 28 is moved axially thereby through the worm 25 and the worm wheel meshing therewith, thus tilting the mirror holder 10 vertically. When the motor M2 is energized, the actuating rod 29 is moved axially thereby through the worm 26 and the worm wheel meshing therewith, thus tilting the mirror holder 10 horizontally.

Figure 4:
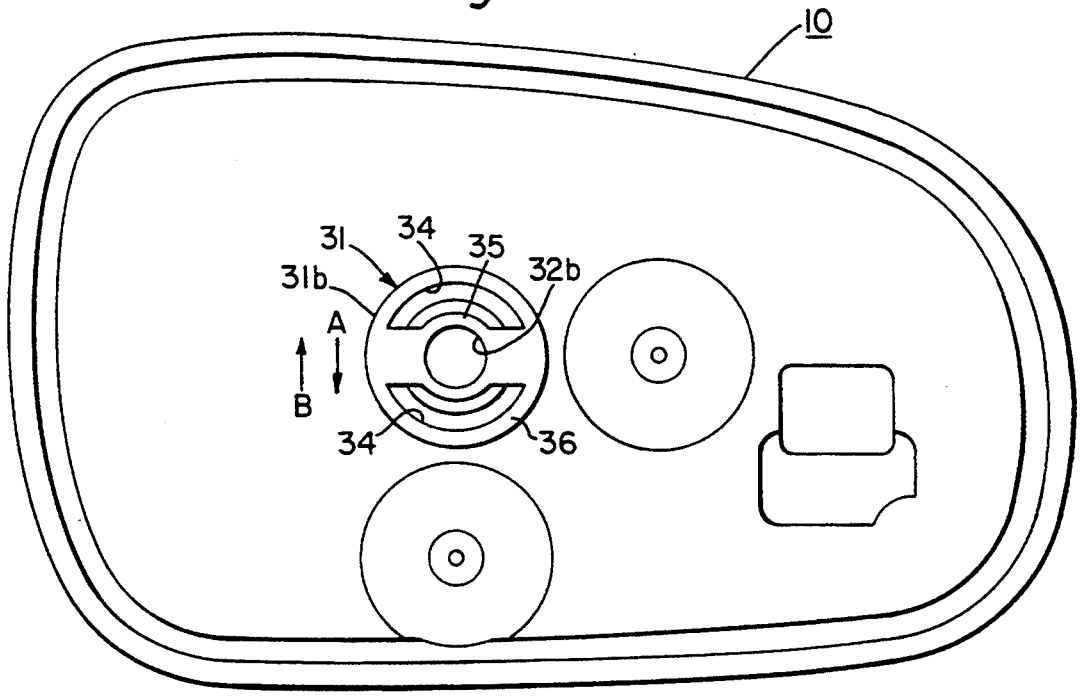
FIG. 4 is an elevational view of the mirror holder as viewed in the direction indicated by the arrow 4 in FIG. 3.
Figure 5:
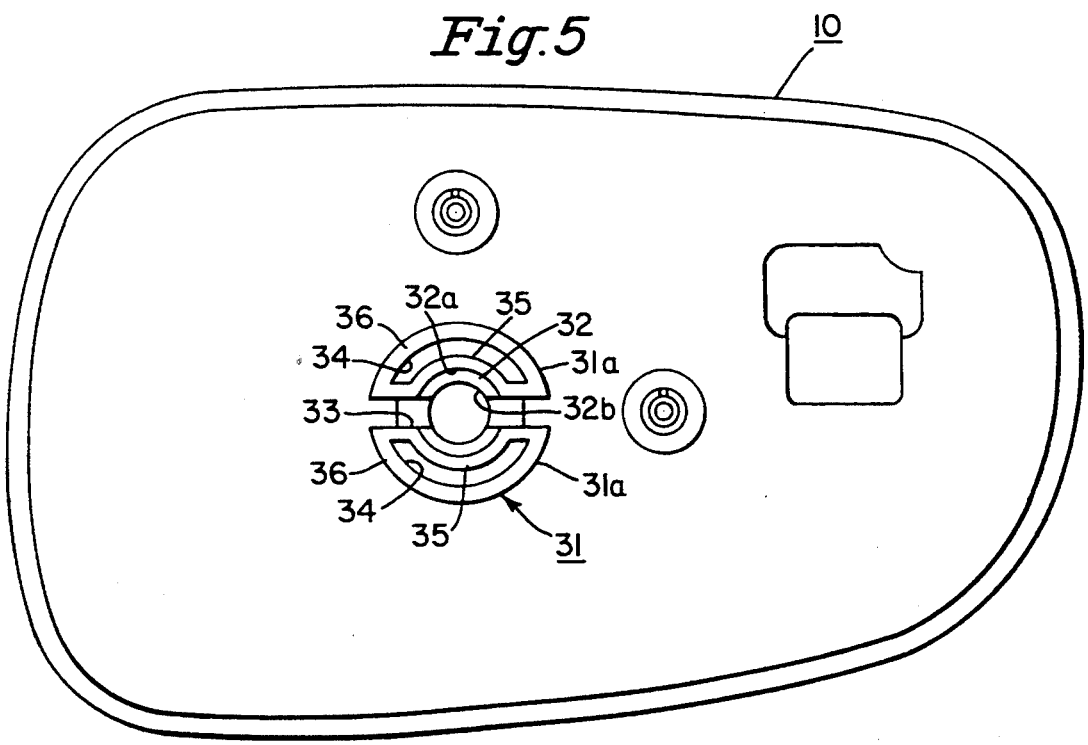
FIG. 5 is an elevational view of the mirror holder as viewed in the direction indicated by the arrow 5 in FIG. 3.

The mirror holder 10 is made of a synthetic resin such as polypropylene. As shown in FIGS. 2 through 6, the mirror holder 10 has a substantially flat panel 10a and a substantially cylindrical attachment 31 projecting from the panel 10a remotely from the mirror 11. As shown in FIG. 5, the attachment 31 comprises a pair of semicylindrical socket members 31a projecting from the back side of panel 10a and a substantially cylindrical base 31b projecting from the face side of the panel 10a away from the semicylindrical socket members 31a. The semicylindrical socket members 31a jointly define an opening 32a therebetween as shown in FIG. 5. The cylindrical base 31b has an opening 32b defined centrally therein as shown in FIG. 4.

Figure 6:
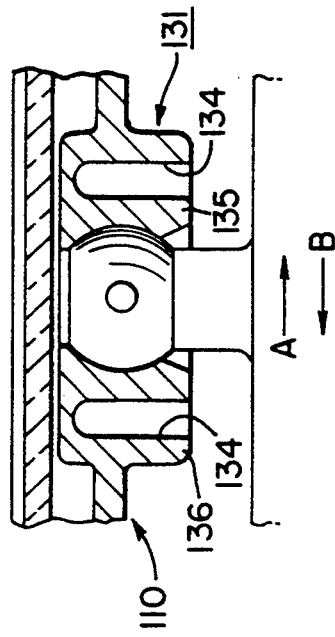
FIG. 6 is an enlarged fragmentary cross-sectional view of the mirror holder support structure, taken along line 6—6 of FIG. 2.

The semicylindrical socket members 31a and the cylindrical base 31b have common inner arcuate walls 35 and common outer arcuate walls 36 (see FIG. 6) which extend across the panel 10a. The inner arcuate walls 35 which are diametrically opposite to each other have arcuate inner surfaces jointly defining a spherical cavity or socket 32. The outer arcuate walls 36 which are also diametrically opposite to each other are supported in their entirety by the panel 10a of the mirror holder 10. The spherical cavity 32 communicates and are aligned with the openings 32a, 32b. The semicylindrical socket members 31a are diametrically spaced from each other by a transverse groove 33 therebetween which extends in the longitudinal direction of the mirror holder 10. The inner and outer arcuate walls 35, 36, i.e., the inner arcuate walls 35 and the panel 10a supporting the outer arcuate walls 36, are radially spaced from each other by arcuate spaces or gaps 34 therebetween which are defined radially outwardly of the spherical cavity 32. The arcuate spaces or gaps 34 extend fully across the panel 10a from the back side to the face side of the mirror holder 10, i.e., between the distal ends of the semicylindrical socket members 31a and the cylindrical base 31b, and opens on the back and face sides of teh mirror holder 10, as shown in FIG. 6. The spherical pivot 19 is rotatably fitted in the spherical cavity 32, and the fingers 46 integral with the spherical pivot 19 are received in the groove 33. Therefore, the mirror holder 10 is swingably supported on the mirror actuator unit 5 by the spherical pivot 19 fitted in the spherical cavity 32 while the mirror holder 10 is being prevented from rotating about the spherical pivot 19 by the fingers 46 engaging in the groove 33.

Since the cylindrical attachment 31 has the spaces or gaps 34 therein, the inner arcuate walls 35 which define the spherical cavity 32 are rendered resilient particularly in the directions indicated by the arrows A, B in FIGS. 4 and 6. Therefore, when the spherical pivot 29 is fitted into the spherical cavity 32, the walls 35 resiliently flexes radially outwardly to a certain extent. The spherical pivot 29 can thus easily be fitted into the spherical cavity 32. After the spherical pivot 29 has been fitted in the spherical cavity 32, the walls 35 resiliently hold the spherical pivot 19, which is securely and stably retained in the spherical cavity 32. Inasmuch as a separate member such as a ring spring is not required to hold spherical pivot 19 in the spherical cavity 32, the number of parts required to support the mirror holder 10 on the mirror actuator unit 5 is relatively small.

Even if the spherical cavity 32 is of smaller dimensions than it should be due to manufacturing errors, the spherical pivot 31 can be smoothly fitted and stably retained in the spherical cavity 32 because of the resilient walls 35. The resilient walls 35 also serve to absorb dimensional changes, such as an expansion or shrinkage, of the mirror holder 10 due to changes in the ambient temperature.

Figure 7:
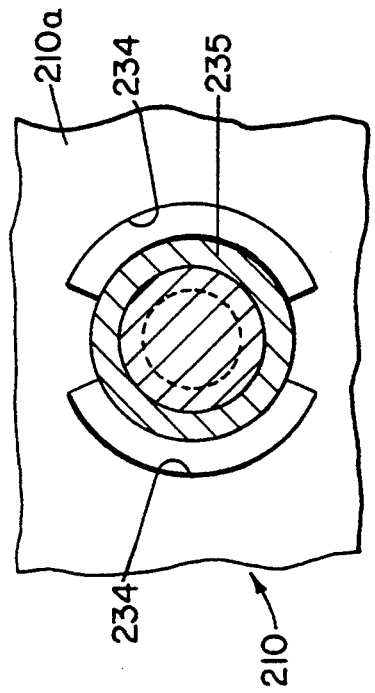
FIG. 7 is an enlarged fragmentary cross-sectional view of a mirror holder support structure according to a second embodiment of the present invention.

FIG. 7 shows a mirror holder support structure according to a second embodiment of the present invention. In FIG. 7, a mirror holder 110 has a substantially cylindrical attachment 131 including radially spaced inner and outer arcuate walls 135, 136 which jointly define spaces or gaps 34 therebetween. The spaces or gaps 34 do not extend fully from the back side to the face side of the mirror holder 110, but are open on the back side of the mirror holder 110 and closed off on the face side of the mirror holder 110.

Figure 8:
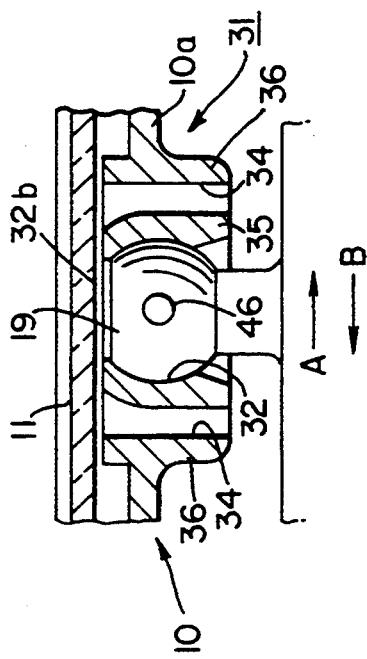
FIG. 8 is an enlarged fragmentary cross-sectional view of a mirror holder support structure according to a third embodiment of the present invention.
Figure 9:
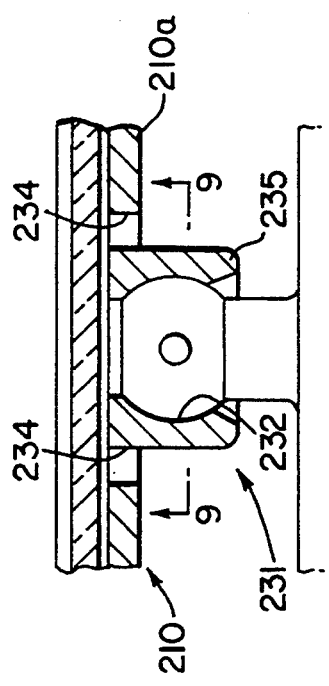
FIG. 9 is a cross-sectional view taken along line 9—9 of FIG. 8.

FIGS. 8 and 9 illustrate a mirror holder support structure according to a third embodiment of the present invention. According to the third embodiment, a substantially cylindrical attachment 231 projects from the back side of a panel 210a of a mirror holder 210, and nothing projects from the face side of the panel 210a. The substantially cylindrical attachment 231 comprises a single wall 235 whose inner surface defines a spherical cavity or socket 232. Arcuate spaces or gaps 234 are defined between the wall 235 and the panel 210a.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention is indicated by the appended claims rather than by the foregoing description.

What is claimed is:

1. A mirror holder support structure for use in an automobile rearview mirror, comprising:
    a mirror housing having a spherical pivot;
    a mirror holder having a substantially flat panel and an attachment disposed integrally with said panel, said attachment having a substantially cylindrical wall extending across said panel and a spherical cavity defined by an inner surface on said cylindrical wall,
    said spherical pivot being rotatably fitted in said spherical cavity on one side of said panel,
    said attachment having a gap defined between said cylindrical wall and said panel and extending in substantially surrounding relation to said cylindrical wall and across said panel such that said cylindrical wall is rendered flexible in the radial direction thereof; and
    a mirror supported on an opposite side of said panel.

2. A mirror holder support structure according to claim 1, wherein said attachment comprises a pair of semicylindrical socket members projecting from said one side of the panel, said semicylindrical socket members having respective inner arcuate walls and respective outer arcuate walls spaced radially outwardly from said inner arcuate walls, said inner arcuate walls defining said spherical cavity therebetween, said gap being defined between said inner arcuate walls and said outer arcuate walls.

3. A mirror holder support structure according to claim 2, wherein said semicylindrical socket members are diametrically spaced from each other by a transverse groove therebetween.

4. A mirror holder support structure according to claim 3, wherein said spherical pivot has a pair of diametrically opposite fingers projecting radially outwardly therefrom and engaging in said transverse groove.

5. A mirror holder support structure according to claim 1, wherein said attachment comprises a wall having a surface defining said spherical cavity, said gap being defined between said wall and said panel.

6. A mirror holder support structure according to claim 1, wherein said gap is open on said one and opposite sides of said panel.

7. A mirror holder support structure according to claim 1, wherein said gap is open on said one side of said panel and closed on said opposite side of said panel.

8. A mirror holder support structure for use in an automobile rearview mirror, comprising:
    a mirror housing having a spherical pivot;
    a mirror holder having a spherical cavity, said spherical pivot being rotatably fitted in said spherical cavity, said mirror holder having a pair of diametrically opposite site inner arcuate walls defining said spherical cavity therebetween and a pair of diametrically opposite outer arcuate walls spaced radially outwardly from said inner arcuate walls by a gap between said inner and outer arcuate walls; and
    a mirror supported on an opposite side of said panel.

9. A mirror holder support structure according to claim 8, wherein said mirror holder has a groove defined between said diametrically opposite inner arcuate walls.

10. A mirror holder support structure according to claim 8, wherein said spherical pivot has a pair of diametrically opposite fingers projecting radially outwardly therefrom and engaging in said groove.

11. A mirror holder support structure according to claim 8, wherein said gap is open on both sides of said mirror holder.

12. A mirror holder support structure according to claim 8, wherein said gap is open on one side of said mirror holder and closed on an opposite side of said mirror holder.

13. A mirror holder support structure according to claim 8 wherein
    said inner arcuate walls are spaced from said mirror holder on a side remote from said rearview mirror.

* * * * *